April 5, 1927.　　　　　　　　　　　　　　　　　1,623,088
F. W. BURPEE
MACHINE FOR CUTTING GREEN CORN FROM THE COB
Filed March 8, 1926　　　　2 Sheets-Sheet 2
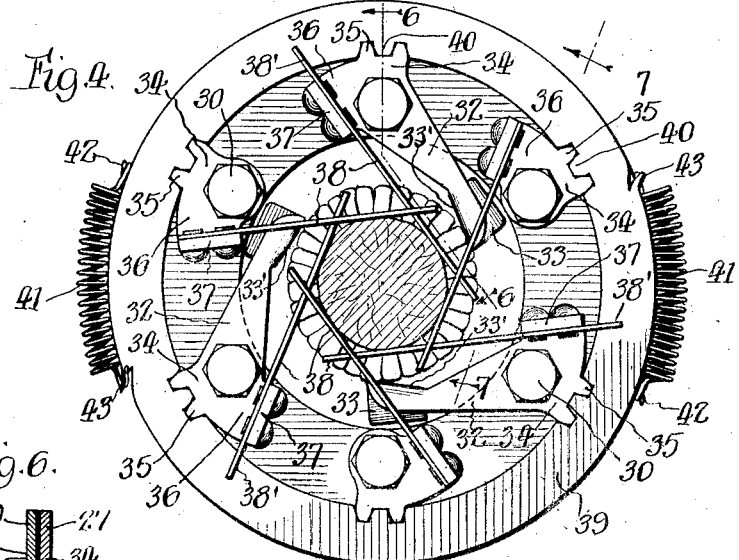
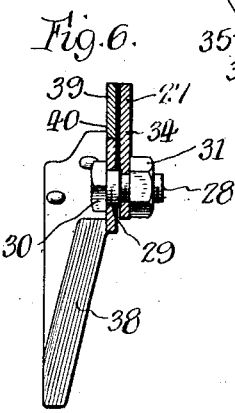
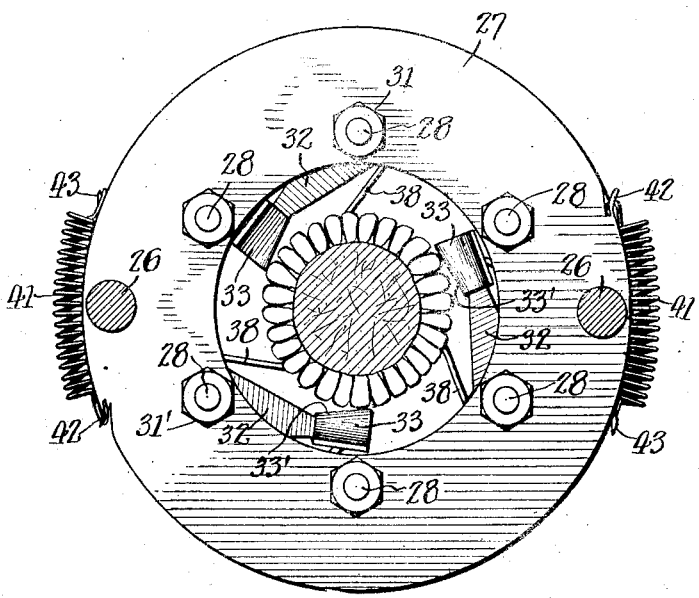
Inventor:
Frank W. Burpee,
By Samuel N. Pond, Atty.

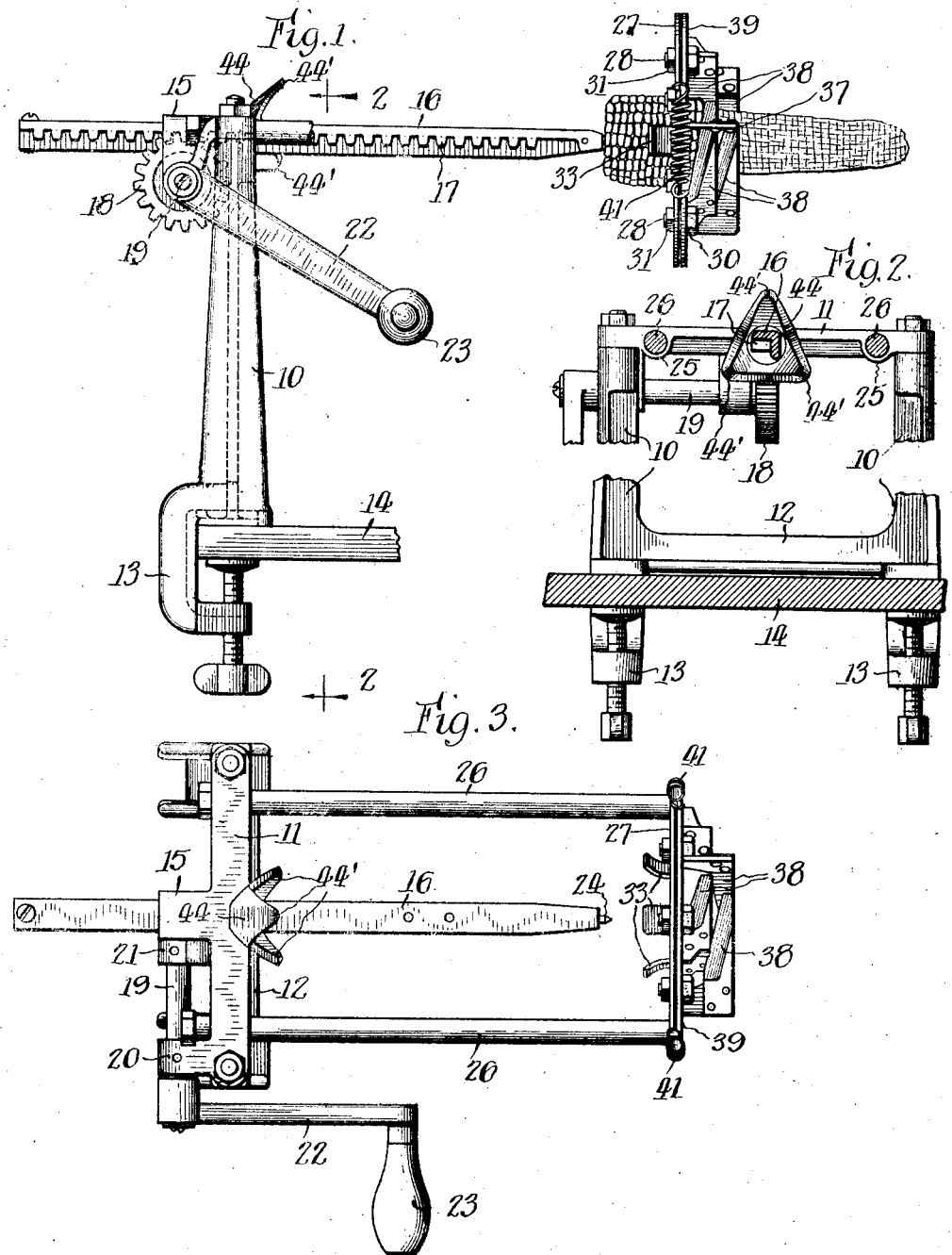

Patented Apr. 5, 1927.

1,623,088

UNITED STATES PATENT OFFICE.

FRANK W. BURPEE, OF CHICAGO, ILLINOIS, ASSIGNOR TO BURPEE CAN SEALER COMPANY, OF CHICAGO, ILLINOIS, A CORPORATION OF ILLINOIS.

MACHINE FOR CUTTING GREEN CORN FROM THE COB.

Application filed March 8, 1926. Serial No. 93,003.

This invention relates to machines for cutting green corn from the cob, and constitutes an improvement upon the machine forming the subject-matter of Letters Patent No. 1,579,511, granted to me April 6, 1926.

A general object of the present invention is to simplify, improve and cheapen the machine of my former patent, which object is accomplished mainly by a substantial reduction in the number of parts. Other more specific objects are, to provide a combined supporting, centering and actuating mechanism for the ring on the cutter head that, by a turning movement, actuates the ear-centering guides and the cutters toward and from the axis of the cutter head, to provide improved means for confining said ring laterally in working position, to provide an improved mechanism for automatically varying the depth of cut of the kernels between the tip and the butt of an ear and also between ears of relatively small and large diameters, and to provide an improved butt-centering device for the ear.

Other objects and attendant advantages of the invention will be apparent to persons skilled in the art as the same becomes better understood by reference to the following detailed description, taken in connection with the accompanying drawings wherein I have illustrated a practical and approved embodiment of the invention, and in which—

Fig. 1 is a side elevation of the machine shown mounted on a table or other support;

Fig. 2 is a vertical cross-section on the line 2—2 of Fig. 1;

Fig. 3 is a top plan view;

Fig. 4 is a front elevation of the cutter head;

Fig. 5 is a rear elevation of the cutter head;

Fig. 6 is a sectional detail on the line 6—6 of Fig. 4; and

Fig. 7 is a sectional detail on the line 7—7 of Fig. 4.

Referring first to Figs. 1, 2 and 3, 10 designates each of a pair of frame uprights or posts connected at top and bottom by cross-bars 11 and 12, respectively, and equipped at their lower ends with clamps 13, by which the machine may be readily mounted on the edge of a table 14 or other suitable support. The upper cross-bar 11 is formed with a hollow bearing boss 15 in which is slidably mounted and guided a pusher rod or bar 16 by which the ear of corn is forced endwise through the cutter head. On the under side of the pusher bar 10 is a rack 17 engaged by a spur pinion 18 fast on a shaft 19 journaled in bearing bosses 20 and 21 formed on the frame member 11. On the outer end of the shaft 19 is a crank arm 22 and handle 23. The advance end of the pusher bar 16 is formed with a spur or prong 24 to pierce the butt end of the ear and support said end as the ear is forced through the cutter head.

The parts thus far described are, or may be, substantially like those shown in my former patent above-identified.

Describing now my improved cutter head, in bosses 25 formed on the cross-bar 11 are rigidly mounted a pair of parallel forwardly extending bars 26, on the forward end of which bars is rigidly mounted a stationary ring 27, best shown in Fig. 5. Referring more particularly to Figs. 4 to 7 inclusive, in the ring 27, adjacent to its inner periphery, are mounted a group (herein shown as six in number) of forwardly projecting studs 28 each of which, as shown in Figs. 6 and 7, is formed with an enlarged bearing 29 having a shouldered engagement with the front face of the head frame or ring 27 and a polygonal head 30 at the other end of the bearing 29. The shanks of the studs are threaded to receive clamping nuts 31 by which they are removably retained in place.

On the bearings 29 of alternate studs 28 are mounted a group of levers, each of which comprises an inwardly extending arm 32 each formed at its free end with a rearwardly bent outwardly flaring extension 33 constituting an ear-centering guide, a short outwardly extending arm 34 carrying a segment gear 35, and a short arm 36 extending substantially at a right angle to the arm 32 and formed with a forwardly bent lateral extension 37 to which extension is attached by screws or rivets a flat inwardly extending cutter blade 38 that lies substantially parallel with the longitudinal median line of the lever arm 32. The alternating levers and cutter blades carried thereby are similar to those previously described except that they preferably omit the arms 32 and their ear-centering guides.

Encircling these guide and blade-carrying levers and lying in the plane of the arms of the latter is a ring 39 formed on its inner periphery with internal segment gears 40 that co-operate with the respective segment gears 35 of the levers; said ring 39 being centered and supported wholly by the segment gears 35 of the several levers, and actuated in one direction by said segment gears. The ring 39 is preferably, and as herein shown, of the same external diameter as the frame ring 27, and lies in substantial side contact with the latter. A pair of pull springs 41 preferably disposed at diametrically opposite points, are each anchored at one end 42 to pins or lugs on the periphery of the frame ring 27 and at the other end 43 to pins or lugs on the periphery of the guide and blade-actuating ring 39. By reference to Figs. 1 and 3 it will be observed that alternating blades 38 are forwardly offset relatively to the remaining blades to permit the blades to lie in intersecting planes, as shown in Fig. 4, and as is common in this art. Means are provided on certain of the levers for confining the ring 39 laterally in place; the simple expedient herein illustrated for this purpose being rearward extensions 38' of alternate cutter blades 38 which overlap the forward face of the ring 39 in all positions of the blades. The outer edges of lever arms 36 form stops to limit the turning of ring 39 under pull of springs 41 through contact with the inner periphery of said ring.

I have stated that one of the objects of this invention is to provide an improved mechanism for automatically varying the depth of cut between the tip and the butt of an ear and also between ears of relatively small and large diameters, so as to effect a clean shave of the cob.

In a machine of the type herein shown wherein the ear-centering guides are each formed with a straight ear-engaging surface or edge that lies transverse to the axis of the cutter head and said guides are mounted to swing substantially radially of the cutter head, as the guides swing outwardly in traveling from the small end of an ear to the large or butt end, the point of contact of the guide with the surface of the ear moves inwardly toward the pivot of the swinging arm that carries the guide. Similarly, an ear of large diameter passing through the head engages the contact surface of the guide considerably nearer the pivot of the arm than an ear of small diameter. And where the cutting blades are directly connected or geared to the levers carrying the centering guides, as in the present machine, if the ear-engaging surface or edge of the guide lies parallel with the plane of its associated blade, kernels of equal length or depth will be shaved from the cob from the point to the butt of the latter, Again, if the ear-engaging surface or edge of the guide converges from its outer to its inner end toward the plane of the blade, kernels of gradually decreasing length or depth will be shaved from the cob from the point to the butt of the latter. Now, in the average run of corn ears, the kernels are shortest at the tip or point of the cob and gradually increase in length or depth toward the butt; and, as a rule, the kernels on large diameter ears are deeper or longer than the kernels on small diameter ears. Hence, under both of the conditions above-specified, the cob would not be shaved clean, but a considerable portion of the kernels at and near the butt end of the cob, or throughout the full length of an ear of large diameter, would be left on the cob. To shave the cob practically clean, the cutter must cut the kernels of gradually increasing length or depth from the point to the butt of the ear, and it must also cut kernels of greater average length or depth from ears of large diameter than from ears of small diameter. I have found that this may be done by the simple expedient of forming on each of the ear-centering guides an ear-engaging surface or edge lying transverse to the axis of the cutter head and diverging from its outer to its inner end from the plane of its associated blade; such ear-engaging surface or edge being shown at 33' in Figs. 4 and 5. As a result of this it will be seen that, in the case of a single ear, as the tangent point of the guide on the surface of the ear travels inwardly toward the pivot of the arm 32 during the movement of the cob through the cutter head, the distance from such tangent point to the blade gradually increases, so that the blade remains substantially tangent to the surface of the cob from end to end of the latter. Similarly, when an ear of large diameter is passed through the machine, its longer kernels contact with the guide at a point nearer the pivot of the arm 32 than do the shorter kernels of an ear of small diameter, so that, in the construction shown, the longer or deeper kernels of a large diameter cob are severed from the cob substantially at the surface of the latter with the same efficiency that the shorter kernels are severed from a cob of small diameter.

In a machine of this type, wherein the ear of corn is pushed endwise through the cutter head during the cutting operation, I have found in practice that unless the tip or point 24 of the pusher bar 16 is centered in the butt of the cob with a reasonable degree of accuracy, the end thrust on the cob will be eccentric, and tend to tilt or cant the ear as the latter passes through the working zone of the cutter head, producing an uneven shave of the cob on opposite sides of the latter. With a view to overcoming this defect in operation, and insuring a more uniform and even shave of the cob, I have designed a simple device for centering the butt of the ear as the latter is positioned in the machine ready to be pushed through the cutter head. This centering means, in the form herein illustrated, comprises a generally cup-shaped member 44 formed on or attached to the inner edge of the upper cross-bar 11 and centrally coincident with the tip or point 24 of the push bar 16, said member, of course, being suitably apertured for the passage of the push bar therethrough. This cob-centering member may be cup-shaped throughout, or it may be formed with three or more substantially uniformly spaced outwardly flaring horns 44' adapted to receive and center the butt ends of ears of varying diameters. Manifestly, when the butt of the ear is pressed into the concave side of the member 44, the latter automatically acts to bring the axis or center of the ear into substantial alignment with the tip of the pusher bar, thus producing an end thrust on the ear that is substanially in line with the axis of the latter, and so preventing the sidewise tilting or canting tendency above-referred to.

The mode of operation of machines of this type is well understood by persons skilled in the art, and no specific or detailed description of the operation, beyond that already given in describing the parts is necessary. As the ear advances through the cutter head, the group of cutter blades is gradually expanded, shaving the kernels off close to the surface of the cob; the described co-operation of the centering guides and the blades automatically severing the longer kernels in the butt region of each ear and on ears of large diameter close to the surface of the cob, thereby avoiding the considerable waste that occurs in machines having only a single uniform cutting depth on the ear.

I have herein shown and described one practical embodiment of the principle of the invention which in practice has been found to satisfactorily effectuate the stated purposes and objects thereof. Manifestly, however, changes in the details of structure and arrangement may be resorted to without departing from the principle of the invention or sacrificing any of its utilities and advantages. Hence, I reserve such variations and modifications as fall within the spirit and purview of the appended claims.

I claim—

1. In a machine for cutting green corn from the cob, the combination of a stationary annular frame member, a circular group of levers pivoted on said frame member, a cutting blade on one arm of each lever, a gear segment on another arm of each lever, a ring encircling said group of levers and formed with internal gear segments in mesh with said lever gear segments and wholly supported by the latter, means for confining said ring against lateral movement away from said frame member, and spring means urging said ring in a direction to swing said cutter blades toward the axis of said frame member.

2. In a machine for cutting green corn from the cob, the combination of a stationary annular frame member, a circular group of levers pivoted on said frame member, a cutting blade on a laterally extending arm of each lever, a gear segment on an outwardly extending arm of each lever, and an ear-centering guide on an inwardly extending arm of certain of said levers, a ring encircling said group of levers and formed with internal gear segments in mesh with said lever gear segments and wholly supported by the latter, means for confining said ring against lateral movement away from said frame member, and spring means urging said ring in a direction to swing said cutter blades and centering guides toward the axis of said frame member.

3. In a machine of the character described, the combination of a stationary annular frame member, a circular group of levers pivoted on said frame member, a cutting blade on a laterally extending arm of each lever, a gear segment on an outwardly extending arm of each lever, a ring encircling said group of levers in lateral juxtaposition to said frame member and formed with internal gear segments in mesh with and wholly supported by said lever gear segments, spring means urging said ring in a direction to swing said cutter blades toward the axis of said frame member, and members carried by said levers overlapping the side of said ring remote from said frame member whereby to confine said ring against lateral displacement.

4. A specific embodiment of claim 3, wherein said ring-confining members consist of rear extensions of said cutting blades.

5. In a machine of the character described, the combination of a stationary annular frame member, a circular group of levers pivoted on said frame member, a flat cutting blade mounted on a laterally extending arm of each lever, an ear-centering guide on the free end of an inwardly extending arm of each lever, each of said guides being formed with an ear-engaging edge lying transverse to the axis of said frame member and diverging from its outer to its inner end from the plane of its associated cutter blade, and spring-actuated means tending to swing said blades and guides toward the axis of said frame member.

6. A specific embodiment of claim 5, wherein the means tending to swing the blades and guides toward the axis of the frame member consists of a ring encircling said group of levers in lateral juxtaposition to said frame member and internally geared to said levers, and one or more pull springs anchored at one end to said frame member and at the other end to said ring.

7. In a machine for cutting green corn from the cob, the combination of an upright frame, an annular cutter head located opposite said frame, a horizontally sliding pusher bar mounted in said frame axially coincident with said cutter head, and a generally cup-shaped rigid ear centering device fixedly mounted on said frame centrally coincident with the axis of said pusher bar and cutter head.

FRANK W. BURPEE.